Jan. 4, 1949. P. G. VANNI 2,458,452
DRIVING DEVICE FOR REVOLVING MEMBERS
Filed Feb. 18, 1944
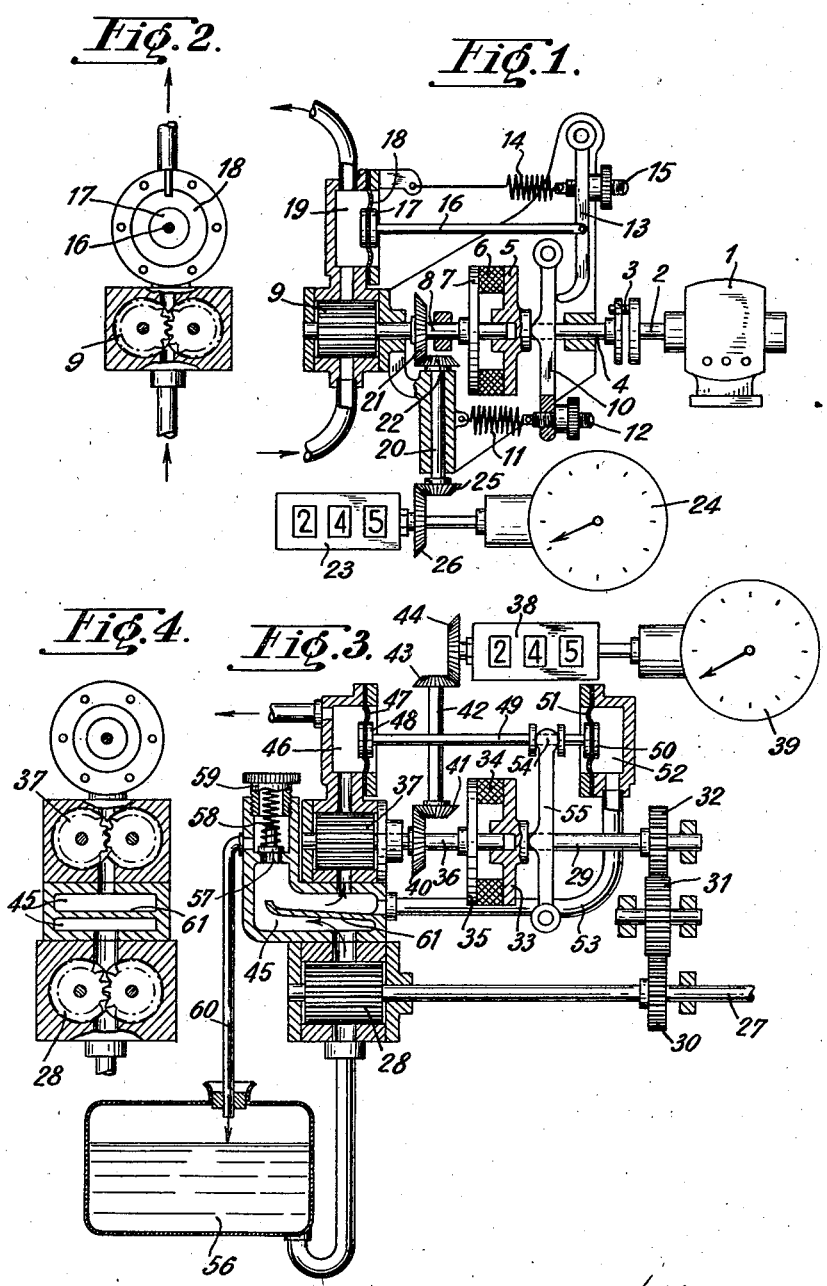
INVENTOR
PIERRE G. VANNI.
By Young, Emery & Thompson
Att/s.

Patented Jan. 4, 1949

2,458,452

UNITED STATES PATENT OFFICE 2,458,452

DRIVING DEVICE FOR REVOLVING MEMBERS

Pierre Georges Vanni, Neuchatel, Switzerland

Application February 18, 1944, Serial No. 522,989
In Switzerland April 5, 1943

1 Claim. (Cl. 103—11)

It is known that the coefficient of friction between two surfaces which slide one on the other, and especially for certain appropriate substances, diminishes and becomes constant above certain sliding speeds.

It is desirable, therefore, when determining given torques that have to counterbalance certain efforts with precision, to utilise the friction of sliding surfaces under the pressure desired. Naturally, the application is made for feeble forces where heating and wear are limited.

The invention relates to a driving-device for a revolving member, which is characterised in that it comprises a revolving driving member which continually co-operates with the revolving member, which it drives with sliding action through the medium of friction means, with a torque practically independent of the speed of this driving-member.

By this means, a pump can be driven in which the outflow pressure remains constant, even if the fluid requirement varies.

However, as the outflow pressure does not exclusively depend on the effort required by the fluid, but that there is the interior friction in the pump (dependent on the viscosity and on the cleanliness of the liquid) which may vary, it is necessary to provide, in certain cases, besides the torque really effective, the requisite torque to absorb these efforts due to the friction.

In these conditions, the pressure of the fluid leaving the pump should be so able to act as to regulate the driving torque—i. e., the pressure itself should increase or reduce the adherence of the friction members determining the driving torque. A perfect adjustment of the outflow pressure is thus obtained. This pump, fitted with the necessary appliances, can be made to give delivery readings.

In the particular case in which the pump is intended to furnish very exact measures, its function can simply be reduced to controlling the passage of the liquid. In this particular case, the liquid would be brought to the pump at the desired pressure and the pump would simply be driven so as to neutralise the effect of all the interior friction, in such a way that it creates no obstacle to the passage of the liquid and that the pressure is equal both at the intake and at the outflow.

The device to which the invention relates can serve still other ends.

The utilisation of the friction as a means of determining permanent torques independent of the number of driving revolutions is illustrated in the annexed drawing, which shows, as examples, two forms of execution of the device to which the invention relates:

Figure 1 is a diagrammatic view in partial section of the first form of execution, which includes a gear-pump;

Figure 2 is a front view with a partial section of the device according to Figure 1;

Figure 3 is a similar view to Figure 1, corresponding to a second form of execution;

Figure 4 is a similar view to Figure 2 relating to this second form of execution.

The device shown comprises a motor 1, the shaft 2 of which drives, by means of a coupling 3, a sliding shaft 4, integral with a plate 5 provided with a friction member 6, bearing, as will be seen later, against a disk 7, itself integral with a shaft 8, which is the shaft of a gear-pump 9. The friction member 6 is pressed against the disk 7 by a lever 10, pulled by a draw-spring 11, the tension of which is adjustable by means of a screw 12. Another lever 13 also acts on the lever 10; the lever 13 is subject, on the one hand, to the action of a draw-spring 14, the tension of which is adjustable by means of a screw 15, and, on the other hand, to the action of a rod 16, integral with a piston 17, fixed to a diaphragm 18 forming one side of a chamber 19, into which the pump 9 discharges. It is seen that, according to Figure 1, when the pressure of the fluid flowing from the pump 9 increases, the rod 16 acts on the lever 13 in the contrary direction to the spring 14. The friction member 6 is pressed against the disk 7 by a force which depends on the adjustment of the tension of the spring 11, on the adjustment of the tension of the spring 14 and on the pressure of the outflow from pump 9. The adjustment is determined so that the pressure of the member 6 against the disk 7 varies automatically, in such a way that the pressure of the fluid in the chamber 19 remains equal at a constant value fixed in advance. The shaft 8 turns a shaft 20 through the medium of two bevel teethed wheels 21, 22. This shaft 20 operates in its turn a motometer 23 and a tachometer 24 through the medium of two bevel pinions 25, 26.

The fluid is discharged by the pump into the chamber 19, from which it enters a pipe controlled by a tap not shown. This tap being shut and the motor 1 revolving, if the gear-pump is of an appropriate type, watertightness being ensured, this pump can hardly revolve or will revolve only very slowly. Under these conditions, besides discharging the fluid, the pump can further, by the number of its revolutions, which corresponds exactly to the discharge, give either the reading of the instantaneous discharge or the indication of the quantity discharge at the end of a certain lapse of time, respectively by means of the tachometer 24 and the motometer 23 graduated directly in fluid quantities. As soon as the aforementioned tap is opened, the fluid begins to flow under the pressure determined by the adjustment, as indicated above. In order that the functioning of the device be correct, the friction member 6 must act constantly—i. e., the maximum discharge at the tap must never allow the disk 7 to reach the number of revolutions of the friction member 6, so that the surfaces co-operating by friction should keep the effective sliding for forming the exact and necessary balance to provide the fluid at the desired pressure, whether flowing or not.

However, it has been seen that the interior friction of the pump exacts a variable torque, which has to be added to that necessary for determining the pressure. The spring 14 adds its effort to that of the spring 11, but this effort, as has been seen, is counteracted by the action due to the pressure in the chamber 19. The piston 17, which is subject to this pressure, acts in the direction allowing the desired correction, for, when the pressure decreases, the spring 14 determines a greater torque on the shaft 8 and, when this pressure increases, a reduction of the torque. Thus a good stabilisation of the outflow pressure in 19 is obtained, even if the torques required by the pump vary from one moment to another. It is understood that, as a variant, a single lever can be substituted for the double-lever arrangement 10—13.

In the second form of execution, a motor (not shown) drives a shaft 27, which in its turn drives a first gear-pump 28 which revolves regularly. This shaft 27 operates also regularly a shaft 29 through the intermediary of gears 30, 31, 32. This shaft 29, integral with a disk 33, bearing a friction member 34, is pressed, as will be seen farther on, against a disk 35, integral with a shaft 36, serving to drive a second gear-pump 37. The shaft 36 operates as well a motometer and a tachometer 39, through the medium of bevel teethed wheels 40, 41, of a shaft 42 and a second pair of bevel wheels 43, 44. The pump 28 discharges into a chamber 45, into which the intake of the pump 37 opens. This pump 37 discharges in its turn into a chamber 46, provided with a diaphragm 47, to which is fixed a piston 48, the rod 49 of which is also integral with a piston 50, fixed to a diaphragm 51 forming one side of a chamber 52 in communication, through a pipe 53, with the chamber 45. The axial movements of the rod 49 are transmitted to a fork 54 of a lever 55 acting on the disk 33.

The pump 28 sucks the liquid from a reservoir 56 and discharges it into the chamber 45. The pump 28, of greater dimensions than the pump 37, discharges more than the latter; so a certain quantity of liquid escapes through a valve 57, which is operated by a spring 58 under tension of a screw-plug 59.

The liquid that has thus passed through the valve 57 returns to the reservoir 56 through a pipe 60. Because of the movements to which the reservoir 56 might be subjected when it is mounted on a lorry or an aeroplane, the pump 28 may draw air with the liquid into the chamber 45. Due to the arrangement that has just been described and to the baffle 61, this air will escape through the valve 57 and hardly anything but liquid can go through the pump 37. In adjusting the tension of the spring 58, the value of the pressure in the chamber 45 can be fixed at will—i. e., the intake pressure of the pump 37.

The pump 37, as has already been seen, opposes scarcely any obstacle to the passage of the liquid. With this object, the pistons 48 and 50 act so as to give the desired drive to this pump. Indeed, as soon as the pressure in the chamber 46 decreases, the piston 48 moves under the influence of the higher pressure prevailing in the chamber 52 and, in acting on the lever 55, occasions a suitable driving of the pump 37, which thus presents no difficulty to the passage of the liquid. If the piston 48 presents a smaller surface than that of the piston 50, the balance of the system will occur for a value of the outflow pressure of the pump 37 surpassing by a quantity determined in advance the intake pressure of this pump. On the other hand, if the sections are equal and suitably chosen so that they give an adequate push to the friction member 34 against the disk 35, the smallest variation of pressure between the intake and the outflow of the pump 37 causes an appropriate variation of the torque transmitted to the shaft 36—i. e., of the drive of the pump 37—in such a way that the latter thus presents no difficulty to the passage of the liquid. In these conditions, even if the pump is not perfectly watertight, the jump in pressure between the intake and the outflow of the pump 37 being practically nil, leaks are so restricted that they are negligible.

It is seen from what precedes that the second form of execution described allows of measuring the discharges with nice precision. The pump 37 has, in this case, a strict function of control; the shaft 36, which drives it, operates also the motometer 38 and the tachometer 39, which can be graduated respectively in quantities of fluid and in delivery of the latter.

In the two forms of execution described above, the utilisation is seen of a friction which is intended to create a torque capable of establishing a force serving to drive a pump.

I claim as my invention:

A device for regulating the outflow pressure of a pump, comprising a revolving member driving the pump, the outflow pressure of which is to be regulated, a second pump, a revolving driving member which continually cooperates with the first-mentioned revolving member, friction means between the revolving members for transmitting a torque practically independent of the speed of the revolving driving member, and means wherein the outflow pressure of the pumps control the adjustment of the friction means, one of said pumps being regularly driven and feeds the other which is driven by the revolving member, the friction means being operated by a member placed under the dependence of the intake pressure of the second pump and by a member placed under the dependence of the outflow pressure of this same pump whereby the outflow pressure is automatically maintained at a value at least equal to the intake pressure of said pump.

PIERRE GEORGES VANNI.

REFERENCES CITED

The following references are of record in the file of this patent:

UNITED STATES PATENTS

| Number | Name | Date |
|---|---|---|
| 1,270,794 | Lawson et al. | July 2, 1918 |
| 1,536,264 | Pardee | May 5, 1925 |
| 2,090,401 | Mayo | Aug. 17, 1937 |
| 2,093,981 | Horton | Sept. 21, 1937 |
| 2,178,864 | Rosenberger | Nov. 7, 1939 |
| 2,220,321 | Eddins | Nov. 5, 1940 |

FOREIGN PATENTS

| Number | Country | Date |
|---|---|---|
| 494,361 | Great Britain | 1938 |